United States Patent

Mukuno et al.

Patent Number: 5,650,449
Date of Patent: Jul. 22, 1997

[54] DEFOAMING AGENT FOR POLYURETHANE FOAM

[76] Inventors: Torahiko Mukuno, 2-5-9 Mita Tama-ku, Kawasaki-shi Kanagawa-ken; Yoshio Ofuji, 103-43 Futatsubashi-cho, Geya-ku, Yokohama-shi, Kanagawa-ken; Masao Takase, 4-900-63 Kahinata, Satte Shi, Saitama-ken, all of Japan

[21] Appl. No.: 636,103

[22] Filed: Apr. 22, 1996

[30] Foreign Application Priority Data

Apr. 26, 1995 [JP] Japan .................. 7-124497

[51] Int. Cl.$^6$ ........................ C08J 9/00
[52] U.S. Cl. ............. 521/111; 521/112; 556/413; 556/437; 556/445; 556/460
[58] Field of Search ............. 521/111, 112; 556/413, 437, 445, 460

[56] References Cited

U.S. PATENT DOCUMENTS

| | | |
|---|---|---|
| 2,970,150 | 1/1961 | Bailey . |
| 3,178,300 | 4/1965 | Gemeinhardt et al. . |
| 3,404,105 | 10/1968 | Rossmy . |
| 3,454,504 | 7/1969 | Murai et al. . |
| 3,577,362 | 5/1971 | Tamura et al. . |
| 3,632,533 | 7/1972 | Winkler . |
| 3,748,288 | 7/1973 | Winkler et al. . |
| 4,005,024 | 1/1977 | Rodriguez et al. ......... 556/413 |
| 5,032,662 | 7/1991 | Berger et al. ............. 528/25 |

*Primary Examiner*—Morton Foelak
*Attorney, Agent, or Firm*—Scully, Scott, Murphy & Presser

[57] ABSTRACT

This invention may be described as follows. (1) A defoaming agent for the production of highly elastic soft and semi-rigid polyurethane foam, having as a main component thereof an organio silicone compound represented by the following formula (I)

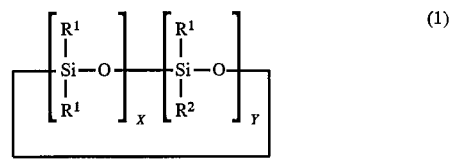

wherein each $R^1$ is a monovalent hydrocarbon group of one to eighteen (18) carbon atoms, $R^2$ is a monovalent hydrocarbon group of one to eighteen (18) carbon atoms or an organic substituent, and x and y are each not less than 1, providing x+y equals a number between 3 to 8. A method for the production of a highly elastic soft and semirigid polyurethane foam with said defoaming agent per formula (1) and a highly elastic soft polyurethane foam and a semirigid polyurethane foam produced by this method are also taught.

17 Claims, 3 Drawing Sheets

DEFOAMING AGENT FOR POLYURETHANE FOAM

BACKGROUND OF THE INVENTION

Polyurethane foam is obtained by the reaction of a polyol compound with an isocyanate compound which gives rise to a macromolecular compound. The reaction of water with the isocyanate compound which generates carbon dioxide gas and the gasification of a foaming agent which produce a foam proceed at the same time. For the purpose of producing a foam with desired physical properties, it is necessary that the balance between the production of the macromolecular compound and the phenomenon of foaming be controlled and the cellular structure of the foam in the process of growth be controlled.

Generally, a polysiloxane compound, particularly a polysiloxane-polyoxyalkylene copolymer, is used as the foam uniformizing agent. A foam stabilizer of a varying structure is used to suit the percentage composition of raw material components and the physical properties of the desired foam. When highly elastic soft and semi-rigid polyurethane foams a are made using conventional polyurethane foam uniformizing agents, these foams shrink because these agents excessively stabilize bubbles to the extent of impeding the conversion of such bubbles into open cells. Generally, for ensuring safe production of these foams, the foam stabilizer to be used possesses weak foam uniformizing power and added defoaming agent is often required for the purpose of controlling the formation of open cells. Examples of typical defoaming agents are low-molecular organic silicone compounds such as diorganopolysiloxanes, diorganopolysiloxane-polyoxyalkylene copolymers, and diorganopolysiloxanes having organic functional groups added thereto in the place of polyoxyalkylene chains.

When such low-molecular organic silicone compounds are used as defoaming agents in the production of a highly elastic soft and semi-rigid polyurethane foam, the process ranges of the reaction conditions and the amounts of foam stabilizer and catalyst to be used during the production of the foam are so restricted as to make it difficult to produce foams of good quality. Further, when these foams are produced in a complicated shape, the they suffer the disadvantage of impaired flowability of the reaction mixture resulting in the generation of voids.

SUMMARY OF THE INVENTION

This invention relates to a defoaming agent to be used in the production of polyurethane foam, a method for the production of polyurethane by the use of the defoaming agent, and a polyurethane to be produced by this method. More particularly, this invention relates to a defoaming agent for polyurethane which can be inexpensively and easily produced and which permits highly elastic soft and semi-rigid polyurethane foam to be produced with a wide process range. This invention allows polyurethane foam with good appearance and property properties to be produced even if foaming is conducted in a complicated shape mold.

The present inventors have found that the problems of the prior art mentioned above in highly elastic soft polyurethane and semirigid polyurethane foam are solved by using a cyclic diorganopolysiloxane as a defoaming agent.

DETAILED DESCRIPTION OF THE INVENTION

Figure 1:
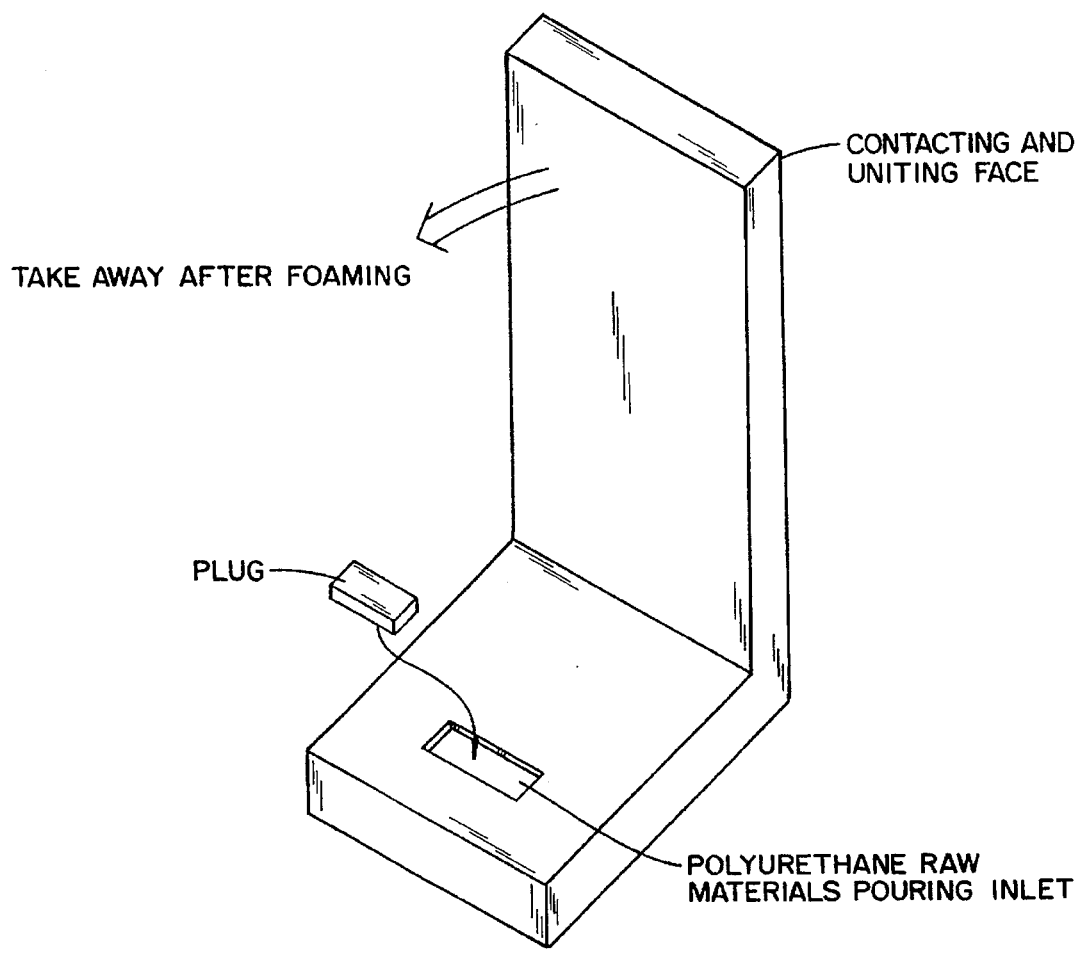
FIG. 1 is the outer appearance of a box used for production of polyurethane foam in the examples.

This invention may be described as follows. (1) A defoaming agent for the production of highly elastic soft polyurethane foam and semirigid polyurethane foam, having as a main component thereof an organic silicone compound represented by the following formula (I)

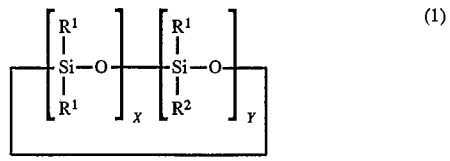

wherein each $R^1$ is a monovalent hydrocarbon group of one to eighteen (18) carbon atoms, $R^2$ is a monovalent hydrocarbon group of one to eighteen (18) carbon atoms or an organic substituent, and x and y are each not less than 1, providing x+y equals a number between 3 to 8.

(2) A method for the production of a highly elastic soft polyurethane foam and a semirigid polyurethane foam by the reaction of a polyol with an isocyanate compound in the presence of a catalyst, a foaming agent, a foam stabilizer, and a defoaming agent, characterized in that a defoaming agent per formula (1) is used as said defoaming agent.

(3) A highly elastic soft polyurethane foam and a semi-rigid polyurethane foam produced by the method which is set forth above (2).

A defoaming agent for production of polyurethane foam to be used in this invention has as a main component thereof an organic silicone compound represented by the following formula (I). In above formula (1), each $R^1$ is the same or different monovalent hydrocarbon group of one to 18 carbon atoms and preferably $R^1$ is methyl, ethyl or phenyl group; most preferably $R^1$ is methyl group. $R^2$ may be a group as defined in $R^1$, but preferably $R^2$ is a organic-substituted group such as polyoxyalkylenealkyl group and aminoalkyl group.

The chemical compound represented by above formula (I) is easily produced by conventionally known production methods. The chemical compound (I) having the same organic group at $R^1$ and $R^2$ can be produced by distillation-separation of product obtained by hydrolysis and dehydration-condensation of diorganodichlorosilane. For instance, a mixture of chemical compounds represented by the following chemical formula (2), with x=3 to 8 is obtained by distillation-refining of product obtained by hydrolysis and dehydration-condensation of dimethyldichlorosilane.

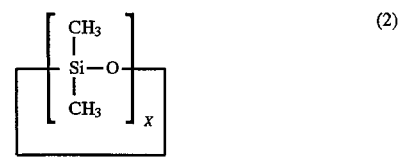

The desired chemical compound is obtained by distillation-separation of above mixture.

The chemical compound (1) having different organic-groups at $R^1$ and $R^2$ can be produced by distillation-separation of product obtained by hydrolysis and dehydration-condensation of a mixture of organohydrogendichlorosilane and diorganodichlorosilane, subsequently conducting addition-polymerization of the unsaturated-group containing chemical compound using a platinum type catalyst. For instance, a chemical compound (10) is obtained by distillation-separation of product obtained by hydrolysis and dehydrationcondensation of equal molar mixture of methylhydrogendichlorosilane and dimethyldichlorosilane, and subsequent addition-polymerization of chemical compound (8) with $CH_2=CH(CH_2)_{i1}O(C_2H_4O)_k(C_3H_6O)_lR^3$ (eq. 9)(wherein $R^3$ is an organic group selected from a hydrogen atom, alkyl group of carbon number 1 to 8, and acyl group of carbon number 1 to 8, k and l represent average number from 0 to 30, i1 represents an integer from 0 to 16) using chlorinated platinic acid catalyst to yield compound (10).

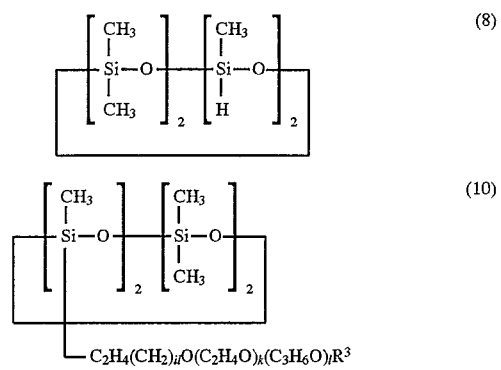

wherein, $R^3$, k, l, and i1 have the same meaning with those defined in above chemical equation (9).

During the production of highly elastic soft and semi-rigid polyurethane foam by the method of this invention, the defoaming agent is an organo silicone compound represented by chemical formula (I). The chemical compound (1) may be employed alone or in combination with other defoamers. The chemical compound (1) may be used by itself without solvent or with solvent to form a solution.

The other components of this invention are known chemical compounds which have been employed in the production of highly elastic soft and semi-rigid polyurethane foam. For instance, tri-functional polyether-polyols having molecular weights of 4500–7000 derived from glycerin can be employed as the polyol component, and aromatic polyisocyanate such as tolylene-2,4-diisocyanate, tolylene-2,6-diisocyanate, di-phenylmethane-4,4'-diisocyanate, 3-methyl diphenylmethane-4,4-diisocyanate, and aliphatic diisocyanate such as hexamethylene diisocyanate, and cycloaliphatic polyisocyanate such as isophorone diisocyanate can be employed as the isocyanate component.

As a foam stabilizer of this invention polysiloxane compounds may be employed. Preferred foam stabilizers include substituted dimethylpolysiloxanes, such as the following diorganosiloxane-polyoxyalkylene copolymers (11) and other types of diorganosiloxane-polyoxyalkylene copolymers (12).

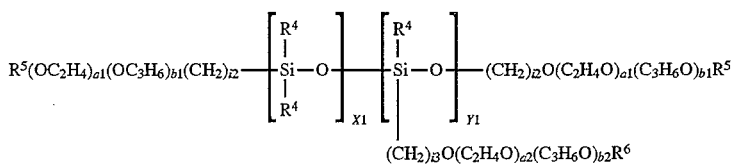

wherein, $R^4$ is an alkyl group of carbon number 1 to 8 or a phenyl group, each $R^4$ may be the same or different, $R^5$ and $R^6$ represent a monovalent group selected from hydrogen atom, alkyl group of carbon number 1 to 8 and acyl group, a1, b1 a2 and b2 are, on average, from 0 to 30, X1 is, on average, from 0 to 600, Y1 is, on average, from 1 to 20, and i3 and i2 are integers from 1 to 18.

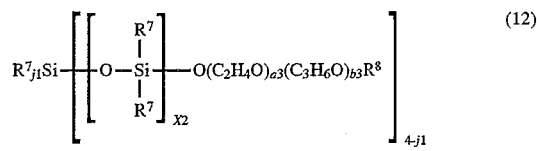

wherein, $R^7$ is an alkyl group of 1 to 8 carbons or a phenyl group, $R^8$ can be hydrogen, an alkyl group of 1 to 8 carbons or a phenyl group, a3 and b3 are, on average, from 0 to 30, x2 is average number from 0 to 20, and j1 is 0 or 1.

As a foaming agent for this invention, water, chlorofluorocarbons and hydrocarbons are employed and as a catalyst, tertiary amine compounds and organometal compounds are employed if necessary. In the production of elastic soft polyurethane foam and semi-rigid polyurethane foam of this invention, well known ingredients such as colorants, antioxidants, ultraviolet absorbents, photo-stabilizers, flame retardants and fillers may be added to the polyurethane raw materials.

The production of the elastic soft polyurethane foam and semi-rigid polyurethane foam of this invention is carried out by mixing polyols, foam stabilizer, catalyst, foaming agent and other ingredients, followed by adding and mixing isocyanate compound to said mixture, followed by pouring the mixture into appointed space such as a mold and followed by foaming and molding. This invention allows for highly elastic soft polyurethane foam and a semirigid polyurethane foam to be stably produced in a wide process range and permitting these foams to be obtained even in a complicated shape with a good appearance without suffering occurrence of voids.

EXAMPLES

This invention also is explained by the following experimental examples, which are not intended to limit the scope of this invention. The following structures are used in the examples.

Foam stabilizer 1—Dimethylpolysiloxane-polyoxyalkylene copolymer.

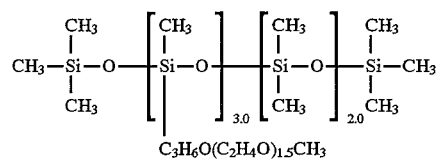

Foam stabilizer 2—Dimethylpolysiloxane having 5 cst viscosity at 25° C.

Defoamer 1—Octamethyl cyclotetrasiloxane (defoamer of this invention with $R^1$ and $R^2$=methyl and x+y=4.)

Defoamer 2—Following chemical compound (14) defoamer of the present invention

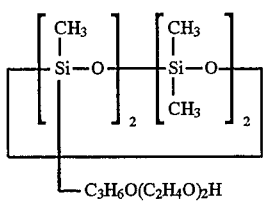

Defoamer 3—Following chemical compound (15) (defoamer of this invention)

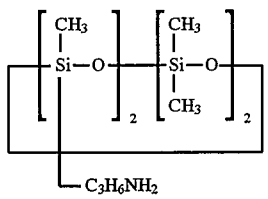

Defoamer 4—Following chemical compound (16) (prior art defoamer)

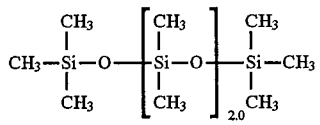

Defoamer 5—Following chemical compound (17) (prior art defoamer)

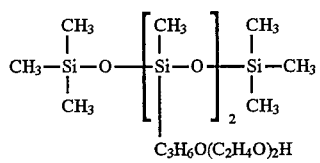

Defoamer 6—Following chemical Compound (18) (conventional defoamer)

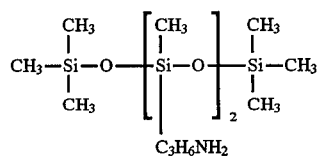

Evaluation method

Breathability—Measured by the method described in page 200–216, Journal of Cellular Plastics 1965 Vol. No.1.

Compressive strength—Measured by the method shown in JIS K6401.

mpact resilience—Measured by the method shown in JIS K6401.

Compressive permanent deformation—Measured by the method shown in JIS K6401.

Figure 2:
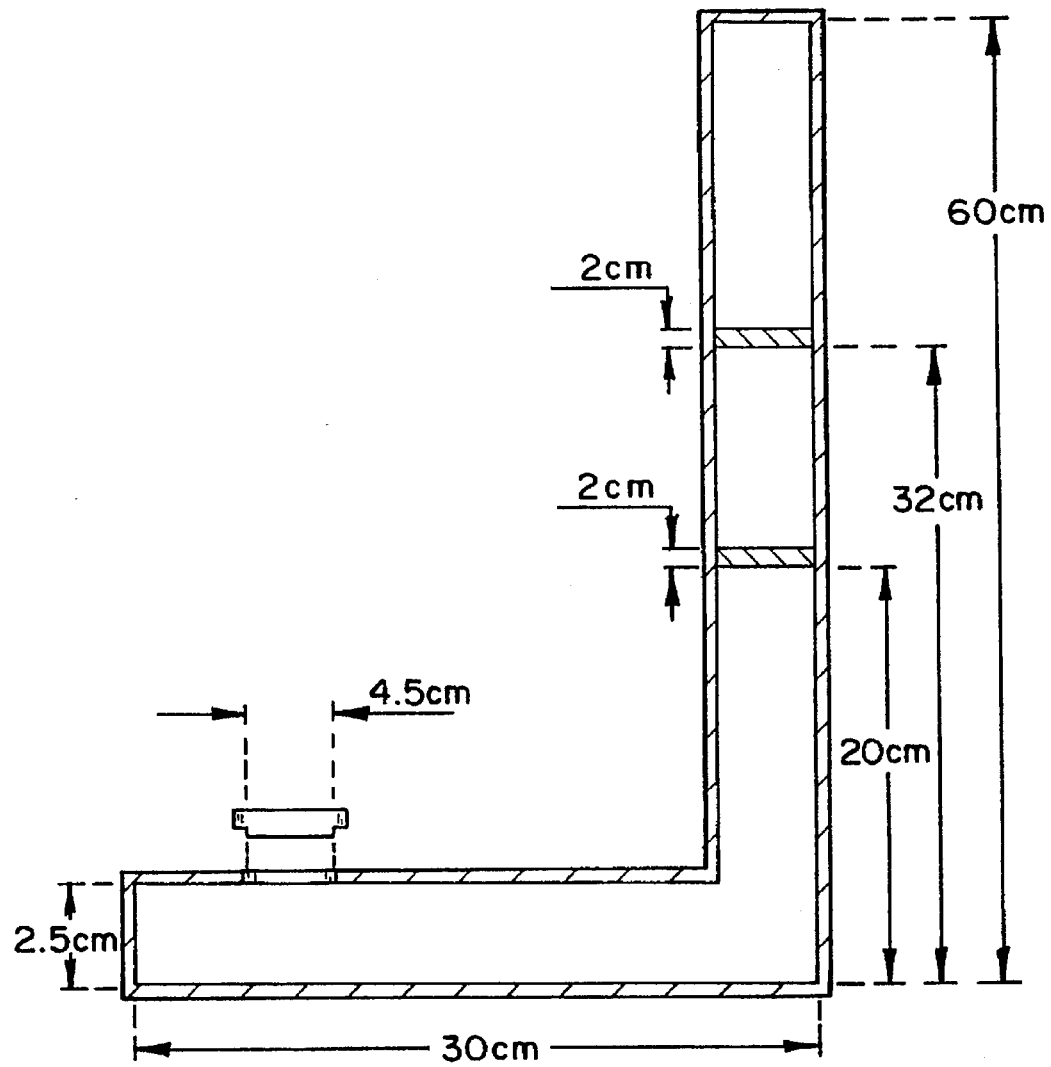
FIG. 2 is a cross-section of the box of FIG. 1.
Figure 3:
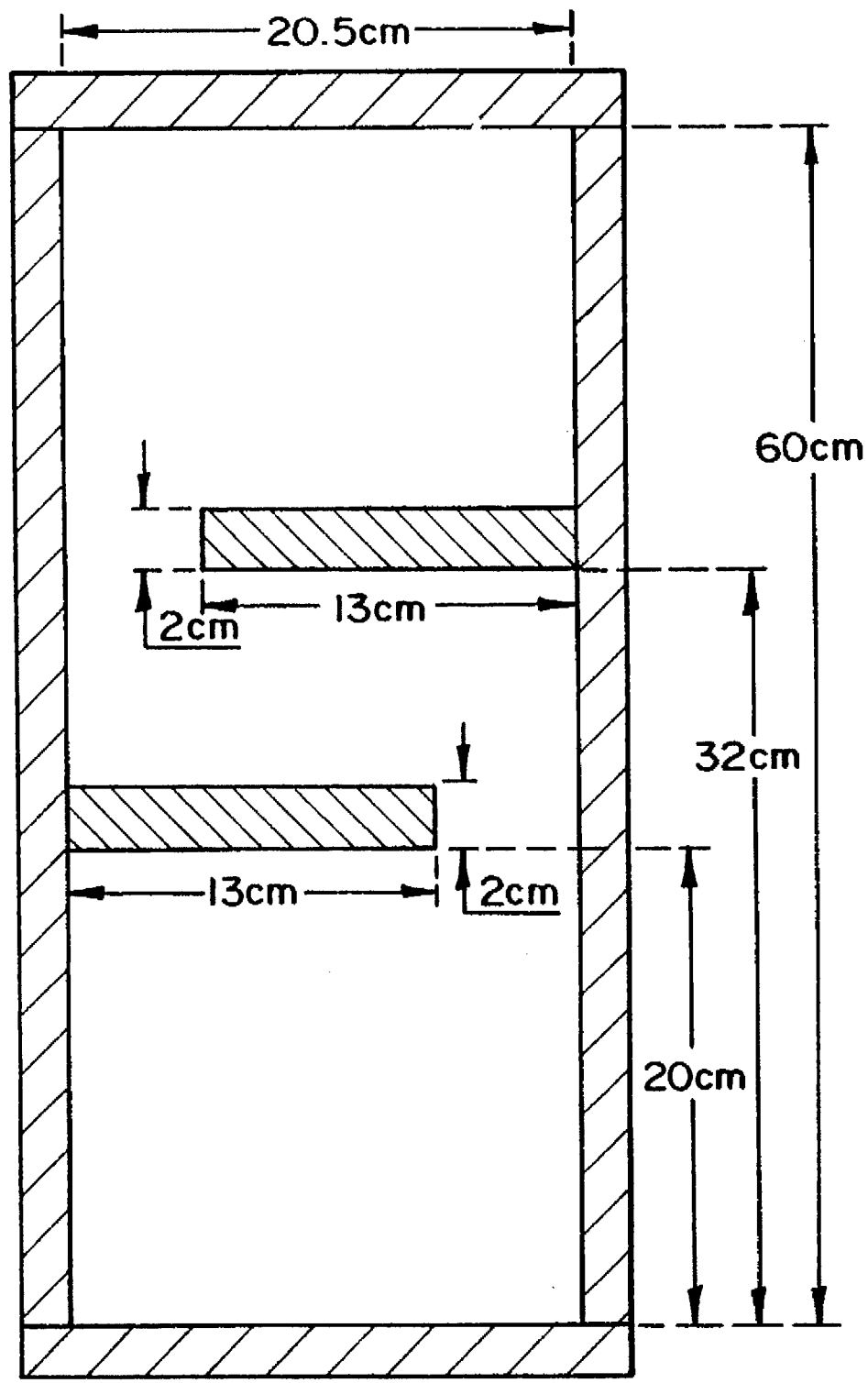
FIG. 3 is another cross-section of the box of FIG. 1.

Example 1—Semirigid Polyurethane Foam 72 g of POP-31/28 (polyether polyol made by Mitsui Thoatsu Chemical Company Ltd., hydroxyl group value 28 KOH mg/g), 108.0 g of EP-3033 (polyether polyol made by Mitsui Thoatsu Chemical Company Ltd., hydroxyl group value 34 KQH mg/g), 4.9 g of $H_2O$, 0.7 g of DABCO® 33LV (amine type catalyst made by Mitsui Air Product Company Ltd.,), 1.1 g of DABCO® X-DM (amine type catalyst made by Mitsui Air Product Company Ltd.,), 1.8 g of diethanol amine, 11 g of Foam Stabilizer I and 25 g of Defoamer I were mixed by high speed agitator. Then 70.0 g of TM-20 (isocyanate made by Mitsui Thoatsu Chemical Company Ltd., NCO group 44.7 wt %) was added to above mixture, the mixture was agitated by high speed and resulting mixture was then poured into the L letter shaped box shown in FIGS. 1–3 having two baffle plate attached to horizontal part and being kept at 40° C. After 15 minutes, the outer appearance, surface finish and void generation near baffle plate were evaluated, and the results are shown in Table 1.

Example 2 to 3, Comparative Example 1 to 8— Semirigid Polyurethane Foam

The same procedures in Example 1 were used, except that the Defoamer and itsuse level were varied as shown in Table 1. The surface finish and void generation were evaluated and the results are shown in Table 1. Examples 1 to 3 using the Defoamer of this invention exhibit good surface appearance and no void formation, while, Comparative Examples 1 to 8 using no Defoamer or using conventionally known Defoamer exhibit void formation near the baffle plate.

Example 4—Highly Elastic Soft Polyurethane Foam 500.0 g of POP-5340 (polyether polyol made by Mitsui Thoatsu Chemical Company Ltd., hydroxyl group value 32 KOH mg/g), 3.3 g of $H_2O$, 2.4 g of DABCO 33 LV, 1.6 g of DABCO X-DM, 5.0 g of diethanol amine, 12.5 g of triethanol amine, Foam Stabilizer 2 and Defoamer 1 (their amount are shown in Table 2) were mixed by high speed agitator. Then 47.1 g of TM-20 (isocyanate made by Mitsui Thoatsu Chemical Company Ltd., NCO group 44.7 wt %) were added to above mixture, the mixture was agitated by high speed and resulting mixture was then poured into 40 cm×40 cm×10 cm box adjusted 60° C. temperature to make foaming. After foaming, the foam was put in the oven at 100° C. temperature, and kept there for 6 minutes to cure the foam. The properties and appearance of the resulting foams are shown in Table 2.

Example 5, Comparative Example 9 to 11—Highly Elastic Soft Polyurethane Foam

The same procedures as set forth in Example 4 were used, except that the Defoamer and its use level were varied as shown in Table 2. Physical properties and appearance characteristics were measured and the results are shown in Table 2.

Example 4 and Example 5 using the Defoamer of this invention yielded excellent, highly elastic soft polyurethane foam having good surface finish and stable (i.e., nonvarying) breathability over the wide use level range of Foam Stabilizer and Defoamer.

Contrary to Example 4 and Example 5, Comparative Examples 9 to 11 using known Defoamers gave poor surface appearance foam when the amount of Foam Stabilizer and Defoamer was low, and low breathability foam when the amount of Foam Stabilizer and Defoamer was high.

TABLE 1

| Example & Comparative Example | Example 1 | 2 | 3 | Comparative 1 | 2 | 3 | 4 | 5 | 6 | 7 | 8 |
|---|---|---|---|---|---|---|---|---|---|---|---|
| Foam stabilizer | FS*¹1 | FS1 | FS1 | FS1 | FS1 | FS1 | FS1 | FS1 | FS1 | FS1 | FS1 |
| Defoamer | DF*²1 | DF2 | DF3 | — | — | DF4 | DF4 | DF5 | DF5 | DF6 | DF6 |
| Foaming NO. | 1 | 2 | 3 | 4 | 5 | 6 | 7 | 8 | 9 | 10 | 11 |
| Amount of FS (g) | 11 | 15 | 15 | 11 | 36 | 11 | 15 | 11 | 15 | 11 | 15 |
| Amount of DF (g) | 25 | 20 | 20 | — | — | 25 | 30 | 25 | 30 | 25 | 30 |
| Foam condition | | | | | | | | | | | |
| Surface finish | good | good | good | good | good | good | good | good | good | good | good |
| Void formation | none | none | none | many | many | little | little | little | little | little | little |

*¹Foam Stabilizer
*²Defoamer

TABLE 2

| Example NO. | Example 4 | | | Example 5 | | | Comparative Example 9 | | | Comparative Example 10 | | | Comparative Example 11 | | |
|---|---|---|---|---|---|---|---|---|---|---|---|---|---|---|---|
| Foam Stabilizer | FS2 | | | FS2 | | | FS2 | | | FS2 | | | FS2 | | |
| Defoamer | DF1 | | | DF2 | | | — | | | DF4 | | | DF5 | | |
| Foaming NO. | 12 | 13 | 14 | 15 | 16 | 17 | 18 | 19 | 20 | 21 | 22 | 23 | 24 | 25 | 26 |
| Amount of FS (g) | 0.25 | 0.5 | 1.0 | 0.25 | 0.5 | 1.0 | 0.5 | 1.0 | 2.0 | 0.25 | 0.5 | 1.0 | 0.25 | 0.5 | 1.0 |
| Amount of DF (g) | 0.25 | 0.5 | 1.0 | 0.25 | 0.5 | 1.0 | — | — | — | 0.25 | 0.5 | 1.0 | 0.25 | 0.5 | 1.0 |
| Foam condition | | | | | | | | | | | | | | | |
| Surface finish | Δ | O | O | Δ | O | O | x | Δ | O | x | x | Δ | x | x | Δ |
| Foam properties | | | | | | | | | | | | | | | |
| Density (kg/m³) | | | | | | | | | | | | | | | |
| Over All | 52.8 | 52.6 | 54.5 | 52.5 | 52.4 | 52.5 | 52.9 | 52.6 | 54.2 | 52.6 | 52.1 | 54.2 | 52.3 | 51.6 | 54.6 |
| Core | 42.1 | 41.1 | 46.5 | 43.0 | 42.3 | 47.5 | 45.7 | 45.7 | 46.6 | 42.4 | 41.6 | 46.6 | 42.2 | 41.3 | 46.4 |
| Breathability (scfm) | | | | | | | | | | | | | | | |
| Roll compresion | | | | | | | | | | | | | | | |
| 3 time | 2.2 | 1.9 | 1.8 | 2.0 | 1.9 | 1.9 | 2.1 | 1.6 | 1.1 | 2.3 | 1.8 | 1.3 | 1.6 | 1.6 | 1.3 |
| 6 time | 2.8 | 2.5 | 1.9 | 2.8 | 2.5 | 1.9 | 2.7 | 2.3 | 1.9 | 3.0 | 2.2 | 1.8 | 2.5 | 2.2 | 2.0 |
| Compressive strength (kg/314 cm) (25% compression) | 21.7 | 21.7 | 21.8 | 22.0 | 21.7 | 21.9 | 21.2 | 22.0 | 21.9 | 20.9 | 18.4 | 22.8 | 20.6 | 18.2 | 23.2 |
| Impact resilience (%) | | | | | | | | | | | | | | | |
| With skin | 57 | 57 | 56 | 57 | 58 | 56 | 59 | 56 | 57 | 60 | 59 | 55 | 60 | 60 | 55 |
| Core | 65 | 65 | 64 | 65 | 64 | 64 | 65 | 66 | 65 | 65 | 66 | 65 | 64 | 64 | 65 |
| Compressive permanent deformation | | | | | | | | | | | | | | | |
| Wet Set (%) | 11.5 | 12.5 | 12.6 | 11.4 | 12.5 | 12.6 | 10.9 | 11.8 | 10.6 | 11.5 | 12.0 | 12.1 | 12.2 | 12.6 | 12.1 |
| Dry Set (%) | 8.8 | 5.0 | 5.3 | 8.9 | 4.9 | 5.3 | 5.1 | 5.1 | 4.7 | 5.2 | 10.4 | 4.3 | 5.3 | 12.1 | 4.5 |

We claim:

1. In a method for controlling the foaming of semi-rigid or highly elastic polyurethane foam the improvement which comprises adding to the raw material matrix a silicone defoaming agent of the formula:

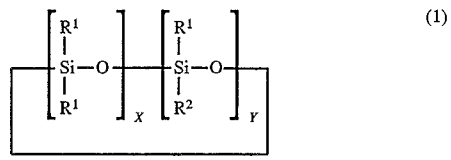

(1)

wherein each $R^1$ is a monovalent hydrocarbon group of one to eighteen (18) carbon atoms, $R^2$ is a monovalent hydrocarbon group of one to eighteen (18) carbon atoms or an organic substituent, and x and y are each not less than 1, providing x+y equals a number between 3 to 8.

2. A method according to claim 1 wherein $R^1$ is methyl, ethyl or phenyl group.

3. A method according to claim 1 wherein $R^2$ is a polyoxyalkylenealkyl group or aminoalkyl group.

4. A method according to claim 3 wherein $R^2$ is $—CH_2CH_2(CH_2)_{i1}O(C_2H_4O)_k(C_3H_6O)_lR^3$ wherein $R^3$ is an organic group selected from a hydrogen atom, alkyl group of carbon number 1 to 8, and acyl group of carbon number 1 to 8, k and l represent average number from 0 to 30, i1 represents an integer from 0 to 16.

5. A method according to claim 4 wherein $R^2$ is $C_3H_6O(C_2H_4)_2H$.

6. A method according to claim 3 wherein $R^2$ is $—C_3H_6NH_2$.

7. A method according to claim 1 wherein x=2.

8. A method according to claim 7 wherein y=2.

9. A method for manufacturing semi-rigid or highly elastic soft polyurethane foam comprising mixing the following: (a) polyol, (b) foam stabilizer, (c) catalyst; (d) foaming agent; (e) isocyante; and (f) a defoaming agent of the formula:

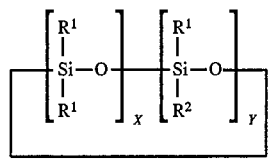 (1)

wherein each $R^1$ is a monovalent hydrocarbon group of one to eighteen (18) carbon atoms, $R^2$ is a monovalent hydrocarbon group of one to eighteen (18) carbon atoms or an organic substituent, and x and y are each not less than 1, providing x+y equals a number between 3 to 8.

10. A method according to claim 9 wherein $R^1$ is methyl, ethyl or phenyl group.

11. A method according to claim 9 wherein $R^2$ is a polyoxyalkylenealkyl group or aminoalkyl group.

12. A method according to claim 11 wherein $R^2$ is $-CH_2CH_2(CH_2)_{i1}O(C_2H_4O)_k(C_3H_6O)_lR^3$ wherein $R^3$ is an organic group selected from a hydrogen atom, alkyl group of carbon number 1 to 8, and acyl group of carbon number 1 to 8, k and l represent average number from 0 to 30, i1 represents an integer from 0 to 16.

13. A method according to claim 12 wherein $R^2$ is $C_3H_6O(C_2H_4)_2H$.

14. A method according to claim 11 wherein $R^2$ is $-C_3H_6NH_2$.

15. A method according to claim 9 wherein x=2.

16. A method according to claim 15 wherein y=2.

17. A composition made by the method according to claim 9.

* * * * *

UNITED STATES PATENT AND TRADEMARK OFFICE
CERTIFICATE OF CORRECTION

PATENT NO. : 5,650,449
DATED : July 22, 1997
INVENTOR(S) : Torahiko Mukumo, et al.

It is certified that error appears in the above-identified patent and that said Letters Patent are hereby corrected as shown below:

Column 5, line 63: "KQH" should read --KOH--

Column 9, line 2, Claim 9: "isocyante" should read --isocyanate--

Signed and Sealed this

Twenty-fifth Day of August, 1998

Attest:

BRUCE LEHMAN

*Attesting Officer*      *Commissioner of Patents and Trademarks*